United States Patent
Jeon et al.

(10) Patent No.: US 10,606,112 B2
(45) Date of Patent: *Mar. 31, 2020

(54) DISPLAY DEVICE INCLUDING QUANTUM DOT COLOR FILTER

(71) Applicant: SAMSUNG DISPLAY CO., LTD., Yongin-si, Gyeonggi-do (KR)

(72) Inventors: Sanghyun Jeon, Yongin-si (KR); Chulmin Bae, Yongin-si (KR); Wooseok Jeon, Yongin-si (KR)

(73) Assignee: SAMSUNG DISPLAY CO., LTD., Yongin-si, Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/514,582

(22) Filed: Jul. 17, 2019

(65) Prior Publication Data
US 2019/0339565 A1 Nov. 7, 2019

Related U.S. Application Data

(63) Continuation of application No. 15/438,034, filed on Feb. 21, 2017, now Pat. No. 10,365,509.

(30) Foreign Application Priority Data

Feb. 22, 2016 (KR) .................... 10-2016-0020675

(51) Int. Cl.
*G02F 1/1335* (2006.01)

(52) U.S. Cl.
CPC .. *G02F 1/133502* (2013.01); *G02F 1/133509* (2013.01); *G02F 1/133514* (2013.01); *G02F 1/133617* (2013.01); *G02F 2001/133614* (2013.01); *G02F 2201/08* (2013.01); *G02F 2201/38* (2013.01); *G02F 2202/36* (2013.01); *G02F 2203/055* (2013.01)

(58) Field of Classification Search
CPC ... G02F 1/133514; G02F 2001/136222; G02F 2201/52; G02F 1/133502; G02F 2201/08; G02F 2201/38; G02F 2001/133614; G02F 1/133617; G09G 3/2003; G09G 2300/0452; G09G 2300/0443; G09G 3/3607; G09G 3/3611; G09G 5/02; G02B 5/201; H01L 27/322; H01L 27/3213; H01L 27/3218; H01L 27/3211
See application file for complete search history.

(56) References Cited

U.S. PATENT DOCUMENTS

| | | |
|---|---|---|
| 2004/0114114 A1 | 6/2004 | Yano et al. |
| 2004/0212762 A1 | 10/2004 | Yeh et al. |
| 2006/0050081 A1 | 3/2006 | Kobayashi et al. |
| 2006/0274226 A1 | 12/2006 | Im et al. |
| 2007/0090755 A1 | 4/2007 | Eida et al. |
| 2013/0242228 A1 | 9/2013 | Park et al. |
| 2015/0205159 A1 | 7/2015 | Itou et al. |

(Continued)

FOREIGN PATENT DOCUMENTS

| | | |
|---|---|---|
| JP | 10-2006-0050610 A | 5/2006 |
| KR | 10-2007-0115995 A | 12/2007 |
| KR | 10-2015-0061968 A | 6/2015 |

*Primary Examiner* — Jia X Pan
(74) *Attorney, Agent, or Firm* — Kile Park Reed & Houtteman PLLC (57) ABSTRACT

A display apparatus includes a blue light blocking layer to block a blue light which is not converted by a color conversion layer, and a reflection preventing layer over the blue light blocking layer to prevent reflection of external light incident thereon.

9 Claims, 6 Drawing Sheets

(56) References Cited

U.S. PATENT DOCUMENTS

| | | |
|---|---|---|
| 2017/0031205 A1 | 2/2017 | Lee |
| 2017/0137705 A1 | 5/2017 | Szwarcman et al. |
| 2017/0255055 A1 | 9/2017 | Liang |
| 2018/0052358 A1 | 2/2018 | Wang |

DISPLAY DEVICE INCLUDING QUANTUM DOT COLOR FILTER

CROSS-REFERENCE TO RELATED APPLICATIONS

This is a continuation application based on pending application Ser. No. 15/438,034, filed Feb. 21, 2017, the entire contents of which is hereby incorporated by reference.

Korean Patent Application No. 10-2016-0020675, filed on Feb. 22, 2016, in the Korean Intellectual Property Office, and entitled: "Quantum Dot Color Filter and Display Device Including the Same," is incorporated by reference herein in its entirety.

BACKGROUND

1. Field

One or more example embodiments relate to a quantum dot color filter and a display apparatus including the same.

2. Description of the Related Art

A liquid crystal display apparatus includes two display plates respectively including electric field generating electrodes, e.g., a pixel electrode and a common electrode, and a liquid crystal layer interposed between the two display plates. During operation of the liquid crystal display apparatus, a voltage is applied to the electric field generating electrodes to generate electric fields in the liquid crystal layer so that liquid crystal molecules of the liquid crystal layer are oriented according to the generated electric fields, and an image is displayed by controlling the polarization of an incident light.

When the liquid crystal display apparatus includes color filters to generate color light, an amount of the light from a backlight source is reduced to about one third (⅓), resulting in low light efficiency. A photo-luminescent liquid crystal display apparatus (PL-LCD) has been developed to compensate for the low light efficiency and to improve color reproduction characteristics. The PL-LCD is a type of liquid crystal display apparatus in which a quantum dot color conversion layer (QD-CCL) is used instead of a conventional color filter is replaced with. The PL-LCD displays a color image using visible light generated by a color conversion layer when light of a low wavelength band, e.g., infrared light or blue light, is used a backlight source.

SUMMARY

According to one or more example embodiments, a display apparatus may include a backlight, a liquid crystal panel provided over the backlight, and a quantum dot color filter provided over the liquid crystal panel. The quantum dot color filter may include a first color conversion layer in a first pixel area and including a plurality of quantum dots to convert an incident light into a first color light, a second color conversion layer in a second pixel area and including a plurality of quantum dots configured to convert an incident light into a second color light, a blue light blocking layer including a first blue light blocking portion over the first color conversion layer to block emission of a blue light of the incident light which is not converted by the first color conversion layer, and a second blue light blocking portion over the second color conversion layer to block emission of the blue light of the incident light which is not converted by the second color conversion layer, and a reflection preventing layer including a first reflection preventing portion over the first blue light blocking portion to prevent reflection of external light incident thereon, and a second reflection preventing portion provided over the second blue light blocking portion to prevent reflection of external light incident thereon.

According to one or more example embodiments, the reflection preventing layer may prevent reflection of blue light of external light incident thereon.

According to one or more example embodiments, the reflection preventing layer may include a plurality of layers having different refractive indices and stacked therein, and the refractive indices of the plurality of layers may become greater as the respective one of the plurality of layers is closer to the blue light blocking layer.

According to one or more example embodiments, the backlight apparatus may emit blue light to be blocked by the blue light blocking layer.

According to one or more example embodiments, the blue light blocking layer may include a plurality of first and second layers which are alternately stacked and include different refractive indices.

According to one or more example embodiments a transmittance of the blue light blocking layer with respect to blue light emitted from the backlight may be equal to or less than 1%.

According to one or more example embodiments, the quantum dot color filter may further include a dispersion material layer provided in a third pixel area.

According to one or more example embodiments, the reflection preventing layer may further include a third reflection preventing portion provided over the dispersion material layer to prevent reflection of an external light incident from the outside thereof.

According to one or more example embodiments, the display apparatus may further include a transparent substrate over the quantum dot color filter, wherein the first reflection preventing portion of the reflection preventing layer may be between the transparent substrate and the first blue light blocking portion, and the second reflection preventing portion of the reflection preventing layer may be between the transparent substrate and the second blue light blocking portion.

According to one or more example embodiments, the display apparatus may further include a transparent substrate provided over the quantum dot color filter, wherein the transparent substrate may be between the first reflection preventing portion and the first blue light blocking portion, and between the second reflection preventing portion of is between the transparent substrate and the second blue light blocking portion.

According to one or more example embodiments, the first reflection preventing portion and the second reflection preventing portion may be spaced apart from one another.

According to one or more example embodiments, a quantum dot color filter may include a first color conversion layer provided in a first pixel area and including a plurality of quantum dots configured to convert an incident light into a first color light, a second color conversion layer provided in a second pixel area and including a plurality of quantum dots configured to convert an incident light into a second color light, a blue light blocking layer including a first blue light blocking portion provided over the first color conversion layer to block emission of a first blue light of the incident light which is not converted by the first color conversion layer, and a second blue light blocking portion over the second color conversion layer to block emission of the first blue light of the incident light which is not converted by the second color conversion layer, and a reflection preventing layer including a first reflection preventing portion provided over the first blue light blocking portion to prevent reflection of external light incident thereon, and a second reflection preventing portion over the second blue light blocking portion to prevent reflection of external light incident thereon.

According to one or more example embodiments, the reflection preventing layer may prevent reflection of a second blue light of external light incident thereon.

According to one or more example embodiments, the reflection preventing layer may include a plurality of layers having different refractive indices and stacked therein, and the refractive indices of the plurality of layers may become greater as the respective one of the plurality of layers is closer to the blue light blocking layer.

According to one or more example embodiments, the backlight apparatus may emit the blue light.

According to one or more example embodiments, the blue light blocking layer may include a plurality of first and second layers which are alternately stacked and have different refractive indices.

According to one or more example embodiments, a transmittance of the blue light blocking layer with respect to blue light may be equal to or less than 1%.

According to one or more example embodiments, the quantum dot color filter may further include a dispersion material layer provided in a third pixel area.

According to one or more example embodiments, the reflection preventing layer may further include a third reflection preventing portion over the dispersion material layer and configured to prevent reflection of the external light incident from the outside.

BRIEF DESCRIPTION OF THE DRAWINGS

Features will become apparent to those of skill in the art by describing in detail exemplary embodiments with reference to the attached drawings in which.

DETAILED DESCRIPTION

The present example embodiments may have different forms and should not be construed as being limited to the descriptions set forth herein. Accordingly, the example embodiments are merely described below, by referring to the figures, to explain aspects of the present description.

It will be understood that although the terms "first", "second", etc., may be used herein to describe various components, these components should not be limited by these terms. These components are only used to distinguish one component from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components.

Sizes of elements in the drawings may be exaggerated for convenience of explanation. In other words, since sizes and thicknesses of components in the drawings are arbitrarily illustrated for convenience of explanation, the following embodiments are not limited thereto. When a certain example embodiment may be implemented differently, a specific process order may be performed differently from the described order. For example, two consecutively described processes may be performed substantially at the same time or performed in an order opposite to the described order.

In the following example embodiments, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

As used herein, the term "and/or" includes any and all combinations of one or more of the associated listed items. Expressions, such as "at least one of," when preceding a list of elements, modify the entire list of elements and do not modify the individual elements of the list.

Reference will now be made in detail to embodiments, examples of which are illustrated in the accompanying drawings, wherein like reference numerals refer to like elements throughout.

Figure 1:
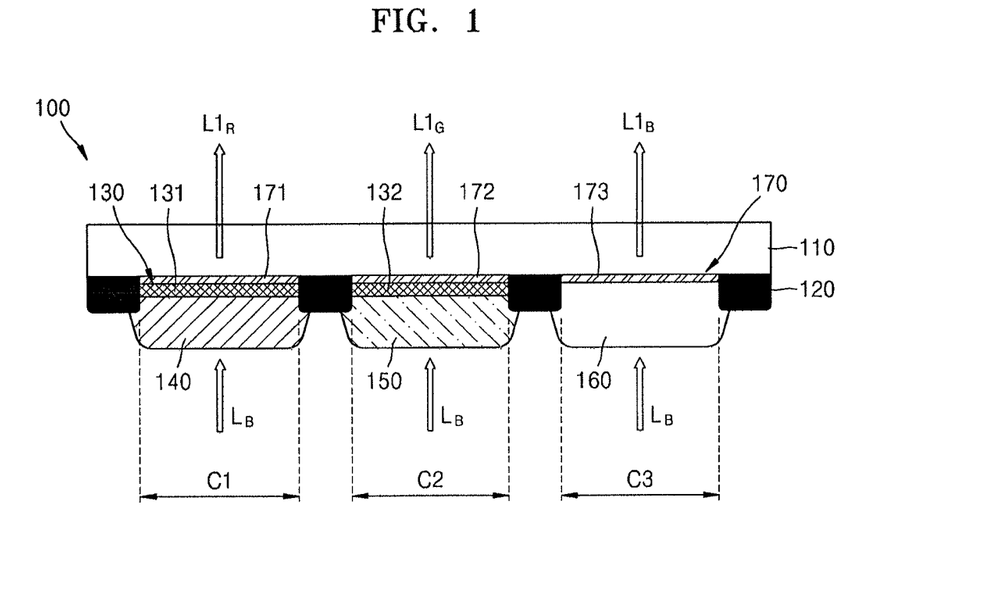
FIG. 1 illustrates a cross-sectional schematic view of a quantum dot color filter according to an example embodiment.
Figure 2:
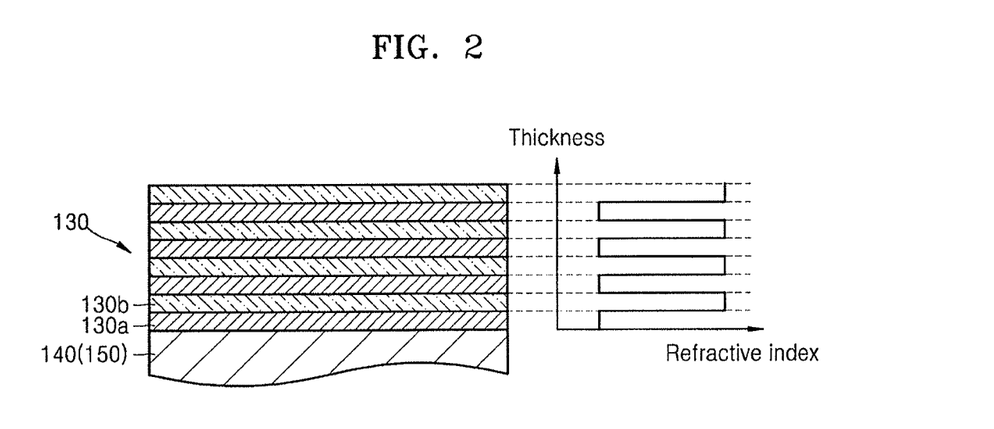
FIG. 2 illustrates an enlarged view of a blue light blocking layer of FIG. 1.
Figure 3:
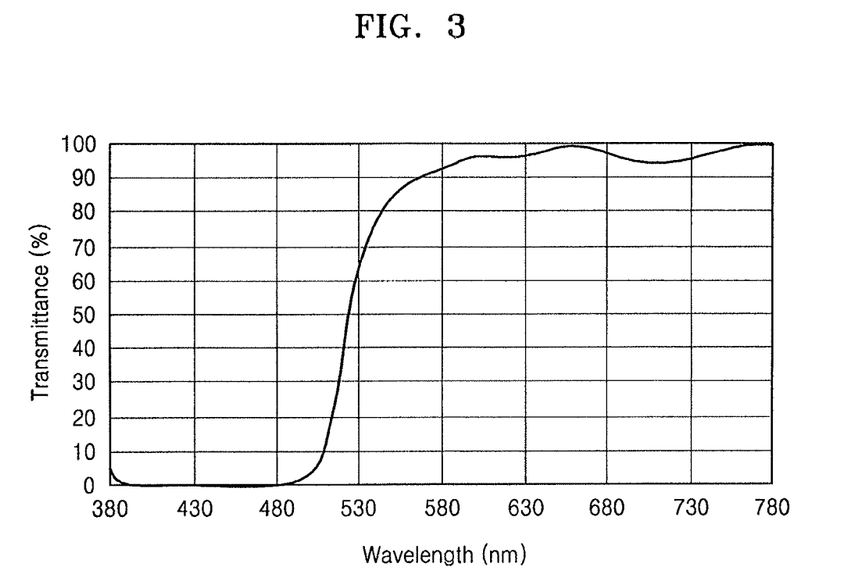
FIG. 3 illustrates a graph of a wavelength transmittance of the blue light blocking layer of FIG. 2.

FIG. 1 is a cross-sectional view schematically illustrating a quantum dot color filter 100 according to an example embodiment. FIG. 2 is an enlarged view of a blue light blocking layer 130 of FIG. 1. FIG. 3 is a graph illustrating a wavelength transmittance of the blue light blocking layer 130 of FIG. 2.

Referring to FIG. 1, the quantum dot color filter 100 may include first, second, and third pixel areas C1, C2, and C3 that respectively generate lights of different colors. For example, when a blue light $L_B$ is incident onto the quantum dot color filter 100, a red light $L1_R$, a green light $L1_G$, and a blue light $L1_B$ may be emitted from the first, second, and third pixel areas C1, C2, and C3, respectively.

A first color conversion layer 140 is provided in the first pixel area C1 and includes a plurality of quantum dots configured to convert an incident light, for example, the blue light $L_B$, into a first color light. The first color conversion layer 140 converts the blue light $L_B$ into light having a wavelength greater than a wavelength of the blue light $L_B$ and emits the converted light. The first color conversion layer 140 may include the plurality of quantum dots configured to absorb a blue light and emit a red light, for example.

A second color conversion layer 150 is provided in the second pixel area C2 and includes a plurality of quantum dots configured to convert an incident light, for example, the blue light $L_B$, into a second color light. The second color conversion layer 150 converts the blue light $L_B$ into light having a wavelength greater than a wavelength of the blue light $L_B$ and emits the converted light. The second color conversion layer 150 may include the plurality of quantum dots configured to absorb a blue light and emit a green light, for example.

When the blue light $L_B$ is incident onto the first pixel area C1, the blue light $L_B$ is converted into the red light $L1_R$. Also, when the blue light $L_B$ is incident onto the second pixel area C2, the blue light $L_B$ is converted into the green light $L1_G$.

Each of the plurality of quantum dots of the first and second color conversion layers 140 and 150 may include one of nanocrystalline materials, e.g., a silicon-based nanocrystal, a group II-VI-based compound semiconductor nanocrystal, a group III-V-based compound semiconductor nanocrystal, a group IV-VI-based compound semiconductor nanocrystal, and a mixture thereof.

The group II-VI-based compound semiconductor nanocrystal may include at least one selected from CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe. The group III-V-based compound semiconductor nanocrystal may include at least one selected from GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The group IV-VI-based compound semiconductor nanocrystal may include SbTe, for example.

Even if the quantum dots of the first and second color conversion layers 140 and 150 include the same material, light emitted from the respective first and second color conversion layers 140 and 150 have different wavelengths from each other according to sizes of the quantum dots of the first and second color conversion layers 140 and 150. The smaller a size of a quantum dot, the shorter a wavelength of the light emitted from the quantum dot. Accordingly, light of different visible colors may be emitted by adjusting sizes of the quantum dots of the first and second color conversion layers 140 and 150.

In order to emit red light from the first color conversion layer 140 and to emit green light from the second color conversion layer 50, the materials of the quantum dots of the first and second color conversion layers 140 and 150 may be the same, but the size of the quantum dots of the first color conversion layer 140 may be greater than the size of the quantum dots of the second color conversion layer 150.

A dispersion material layer 160 may be in the third pixel area C3 to disperse the incident light. The dispersion material layer 160 transmits light, i.e., the blue light $L_B$, without conversion thereof such that non-converted blue light $L1_B$ is emitted from the dispersion material layer 160.

The dispersion material layer 160 may include titanium oxide $TiO_2$. However, the dispersion material layer 160 is not limited thereto. The dispersion material layer 160 may include at least one of various materials as long as the material does not convert, but simply disperses, the incident light.

The first, second, and third pixel areas C1, C2, and C3 may be separated from each other by partitions 120 disposed over a transparent substrate 110. The partitions 120 may include a black matrix to avoid color mixing among the first, second, and third pixel areas C1, C2, and C3.

A blue light blocking layer 130 may be provided over the first and second color conversion layers 140 and 150 and may block emission of the blue light $L_B$ which has not been converted by the first and second color conversion layers 140 and 150. The blue light blocking layer 130 may include a first blue light blocking portion 131 disposed over the first color conversion layer 140 and a second blue light blocking portion 132 disposed over the second color conversion layer 150.

The first blue light blocking layer 131 transmits the red light $L1_R$ converted from the blue light $L_B$ by the first color conversion layer 140 and blocks the blue light $L_B$ which has not been converted by the first color conversion layer 140. The second blue light blocking layer 132 transmits the green light $L1_G$ converted by the second color conversion layer 150 and blocks the blue light $L_B$ which has not been converted by the second color conversion layer 150.

The blue light blocking layer 130 has a low transmittance with respect to the blue light $L_B$ and a high transmittance with respect to the other visible light. For example, a transmittance of the blue light blocking layer 130 with respect to a blue light having a wavelength of about 466 nm may be less than 1%, and a transmittance of the blue light blocking layer 130 with respect to the other light of a wavelength longer than 530 nm may be greater than 50%, as illustrated in FIG. 3.

The blue light blocking layer 130 may have a stack structure including a plurality of layers that have different refractive indices from one another and are alternately stacked. Referring to FIG. 2, the blue light blocking layer 130 may have a stack structure in which first and second layers 130a and 130b respectively having different refractive indices are alternately stacked. However, a structure of the blue light blocking layer 130 is not limited thereto. The blue light blocking layer 130 may have various structures as long as the structure of the blue light blocking layer 130 includes a plurality of layers which are alternately stacked therein. For example, the structure of the blue light blocking layer 130 may include more than three layers which are alternately stacked therein.

The first layer 130a and the second layer 130b may include a transparent material. For example, the first layer 130a may include silicon oxide $SiO_2$, and the second layer 130b may include silicon nitride $SiN_x$. The first layer 130a and the second layer 130b may be formed via a chemical vapor deposition (CVD) method. However, the present disclosure is not limited thereto, and thus, the first layer 130a and the second layer 130b may be formed via other deposition methods.

As described above, the blue light blocking layer 130 selectively transmits light which enters thereinto and, thus, improves a color reproduction characteristic of the quantum dot color filter 100.

However, since the blue light blocking layer 130 has a stack structure in which a plurality of layer having different refractive indices are repeatedly stacked, the blue light blocking layer 130 has a first blocking characteristic for light traveling from a first side, e.g., an inside, to an opposite second side, e.g., outside thereof, and a second blocking characteristic for light traveling from the second side to the first side. Accordingly, external light which enters the second side of the blue light blocking layer 130 may be unintentionally reflected. For example, the blue light blocking layer 130 may reflect the external light, e.g., blue light, which enters from the second side.

Figure 4:
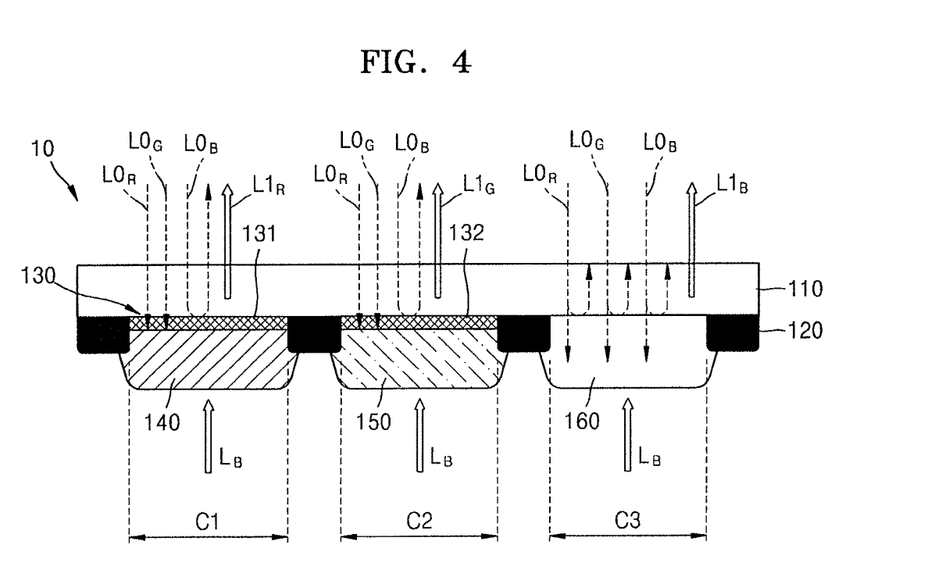
FIG. 4 illustrates a schematic view of a structure of a quantum dot color filter as a comparative sample.

FIG. 4 is a view schematically illustrating a structure of a quantum dot color filter 10 as a comparative sample.

Referring to FIG. 4, an external light may be visible light including red light $L0_R$, green light $L0_G$, and blue light $L0_B$. The external light may be introduced to the color filter 10 through the transparent substrate 110, such that it is incident on the second surface of the blue light blocking layer 130.

The external light, such as the red light $L0_R$ and a green light $L0_G$, may not be reflected by the blue light blocking layer 130, but most of the blue light $L0_B$ may be reflected by the blue light blocking layer 130. For example, more than about 50% of the external light, such as the red light $L0_R$ and a green light $L0_G$, may be transmitted through the blue light blocking layer 130, and more than about 99% of the blue light $L0_B$ may be reflected by the blue light blocking layer 130. Accordingly, the red light $L1_R$ transmitted through the first blue light blocking portion 131 may be mixed with the reflected blue light $L0_B$ in the first pixel area C1. Also, the green light $L1_G$ transmitted through the second blue light blocking portion 132 may be mixed with the reflected blue light $L0_B$ in the second pixel area C2. Therefore, the mixing may cause a low color reproduction characteristic.

Referring back to FIG. 1, considering the above-described mixing, in the quantum dot color filter 100 according to an embodiment, a reflection preventing layer 170 may be disposed over the blue light blocking layer 130.

Figure 5:
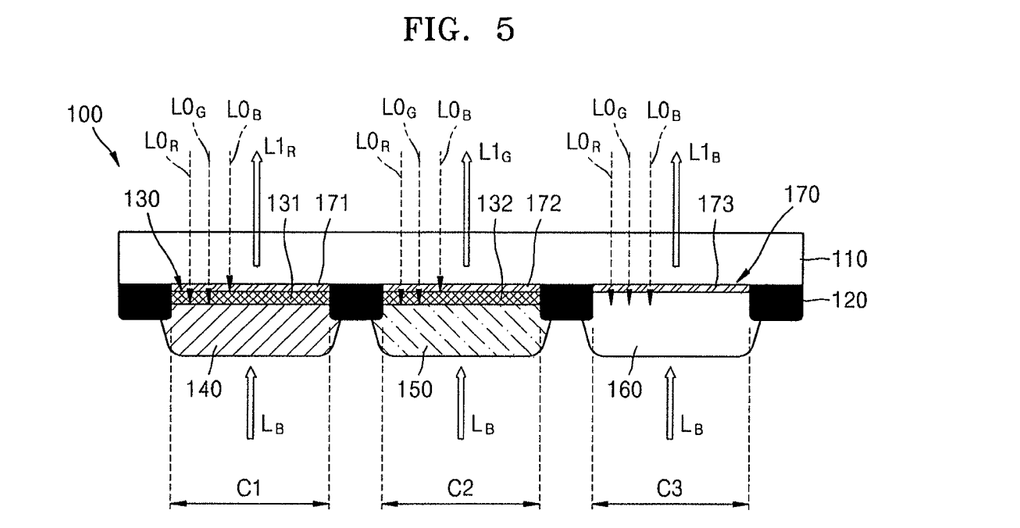
FIG. 5 illustrates a view explaining a reflection preventing layer of FIG. 1.
Figure 6:
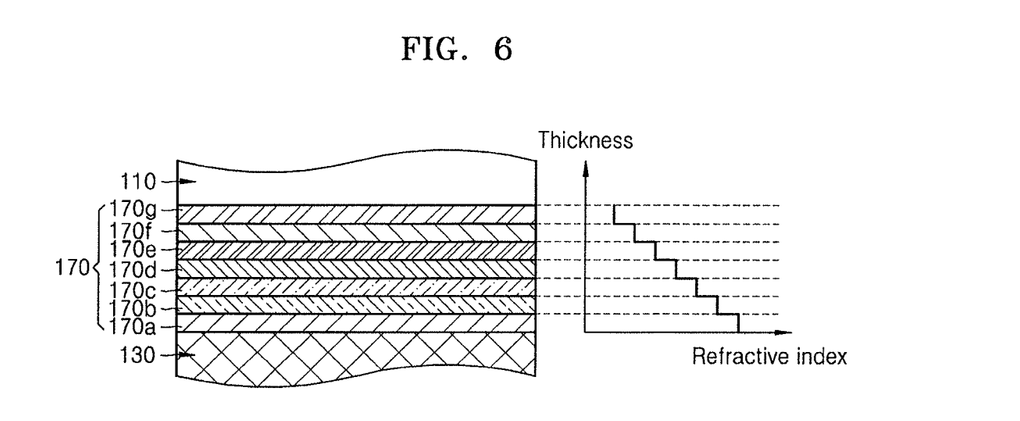
FIG. 6 illustrates an enlarged view of a reflection preventing layer of FIG. 1.

FIG. 5 is a view explaining the reflection preventing layer 170 of FIG. 1 and FIG. 6 is an enlarged view of the reflection preventing layer 170 of FIG. 1. Referring to FIG. 5, the reflection preventing layer 170 may include a first reflection preventing portion 171 disposed over the first blue light blocking portion 131 and a second reflection preventing portion 172 disposed over the second blue light blocking portion 132.

The first and second reflection preventing portions 171 and 172 of the reflection preventing layer 170 may be disposed on the transparent substrate 110. For example, the first reflection preventing portion 171 may be disposed between the transparent substrate 110 and the first blue light blocking portion 131, and the second reflection preventing portion 172 may be disposed between the transparent substrate 110 and the second blue light blocking portion 132.

The reflection preventing layer 170 may prevent reflection of the blue light $L0_B$ of the external light which is incident from an outside thereof. The reflection preventing layer 170 may not reflect, but may absorb the red light $L0_R$, the green light $L0_G$, and the blue light $L0_B$ of the external light. Accordingly, since the external light is not reflected, the external light is prevented from being mixed with the red light $L1_R$ and the green light $L1_G$ which are emitted from the first and second color conversion layers 140 and 150, respectively.

In the first pixel area C1, the external light is absorbed by the reflection preventing layer 170, the first blue light blocking portion 131, and/or or the first color conversion layer 140. Accordingly, the red light $L1_R$ converted by the first color conversion layer 140 passes through the first blue blocking portion 131 and the reflection preventing layer 170 to be transmitted to the outside, without being effected by the reflected external light.

In the second pixel area C2, the external light is absorbed by the reflection preventing layer 170, second blue light blocking portion 132, and/or the second color conversion layer 150. Accordingly, the green light $L1_G$ converted by the second color conversion layer 150 passes through the second blue blocking portion 132 and the reflection preventing layer 170 to be transmitted to the outside, without being effected by the reflected external light.

Referring to FIGS. 5 and 6, the reflection preventing layer 170 may include a plurality of layers 170a, 170b, 170c, 170d, 170e, and 170f having refractive indices different from one another. The refractive indices of the plurality of layers 170a, 170b, 170c, 170d, 170e, and 180f become greater from the outside to the inside thereof, i.e., may increase from the substrate 110 to the pixel areas.

The refractive indices of the plurality of layers 170a, 170b, 170c, 170d, 170e, and 170f of the reflection preventing layer 170 gradually increase from the outside to the inside. For example, the refractive indices of the plurality of layers 170a, 170b, 170c, 170d, 170e, and 170f of the reflection preventing layer 170 increase as the plurality of layers 170a, 170b, 170c, 170d, 170e, and 170f of the reflection preventing layer 170 are further away from the transparent substrate 110. The refractive indices of the plurality of layers 170a, 170b, 170c, 170d, 170e, and 170f of the reflection preventing layer 170 may increase as the plurality of layers 170a, 170b, 170c, 170d, 170e, and 170f of the reflection preventing layer 170 are closer to the blue light blocking layer 130.

The plurality of layers 170a, 170b, 170c, 170d, 170e, and 170f may include at least one of silicon oxide, silicon nitride, or silicon nitride oxide. For example, the layers 170a, 170b, and 170c adjacent to the blue light blocking layer 130 may include silicon nitride, the layer 170g adjacent to the transparent substrate 110 may include silicon oxide, and the layers 170d, 170e, and 170f between the layers 170a, 170b, and 170c, and the layer 170g, may include silicon nitride oxide.

However, the number, materials, and refractive indices of the plurality of layers 170a, 170b, 170c, 170d, 170e, and 170f of the reflection preventing layer 170, i.e., the first reflection preventing portion 171 and the second reflection preventing portion 172, are illustrated as an example. If the refractive indices of the plurality of layers 170a, 170b, 170c, 170d, 170e, and 170f become greater from the outside to the inside thereof, at least one of the number, the materials, and the refractive indices may be changed.

Meanwhile, referring to FIGS. 1 and 5, the reflection preventing layer 170 may further include a third reflection preventing portion 173 disposed over the dispersion material layer 160. The third reflection preventing portion 173 of the reflection preventing layer 170 may include the plurality of layers 170a, 170b, 170c, 170d, 170e, and 170f of different refractive indices, respectively. The refractive indices of the plurality of layers 170a, 170b, 170c, 170d, 170e, and 170f of the reflection preventing layer 170 become greater from the outside to the inside. For example, the refractive indices of the plurality of layers 170a, 170b, 170c, 170d, 170e, and 170f of the reflection preventing layer 170 gradually increase from the outside to the inside.

A structure and a material of the third reflection preventing portion 173 of the reflection preventing layer 170 may be same as the structure and the material of the first reflection preventing portion 171 and the second reflection preventing portion 172. Accordingly, the third reflection preventing portion 173 may be simultaneously formed when the first and second reflection preventing portions 171 and 172 are formed.

Since the third reflection preventing portion 173 prevents reflection of the external light which is incident from the outside, decrease of a color reproduction characteristic may be reduced or prevented. Accordingly, in the third pixel area C3, the blue light $L1_B$ dispersed by the dispersion material layer 160 passes through the reflection preventing layer 170 and then is emitted outside. The external light is absorbed by the third reflection preventing portion 173 and/or the dispersion material layer 160.

Figure 7:
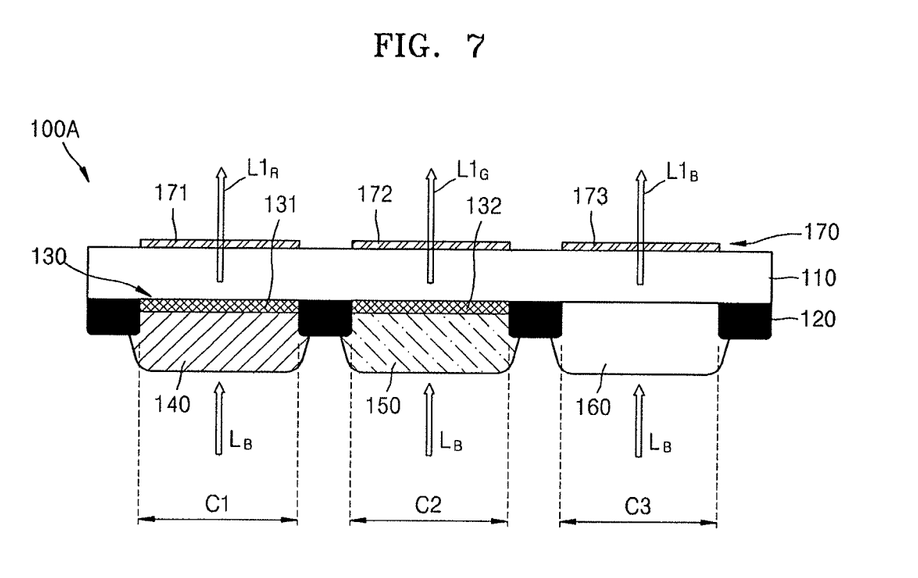
FIG. 7 illustrates a cross-sectional view schematically of a quantum dot color filter according to an example embodiment.

While the reflection preventing layer 170 is shown in FIGS. 1 and 5 is the transparent substrate 110 and is directly on the blue light blocking layer 130 or the dispersion material layer 160, embodiments are not limited thereto. As illustrated in FIG. 7, the reflection preventing layer 170 may be above the transparent substrate 110 in the quantum dot color filter 100A. In this case, the reflection preventing layer 170 and the blue light blocking layer 130 may be spaced apart from each other, and the reflection preventing layer 170 and the dispersion material layer 160 may be spaced apart from each other. Further, while illustrated as separate reflection prevention layers 171, 172, 173, i.e., are spaced apart from one another on the transparent substrate 110, the reflection preventing layer 170 may be provided as a single layer on the exterior of the substrate 110 to overlap all of the pixel areas C1 to C3.

Also, in the above described embodiment, the quantum dot color filter 100 includes a plurality of pixel areas, that is, the first through third pixel areas C1, C2, and C3. However, this is illustrative. A quantum dot color filter may include first through fourth pixel areas C1, C2, C3, and C4 as illustrated in FIG. 8.

Figure 8:
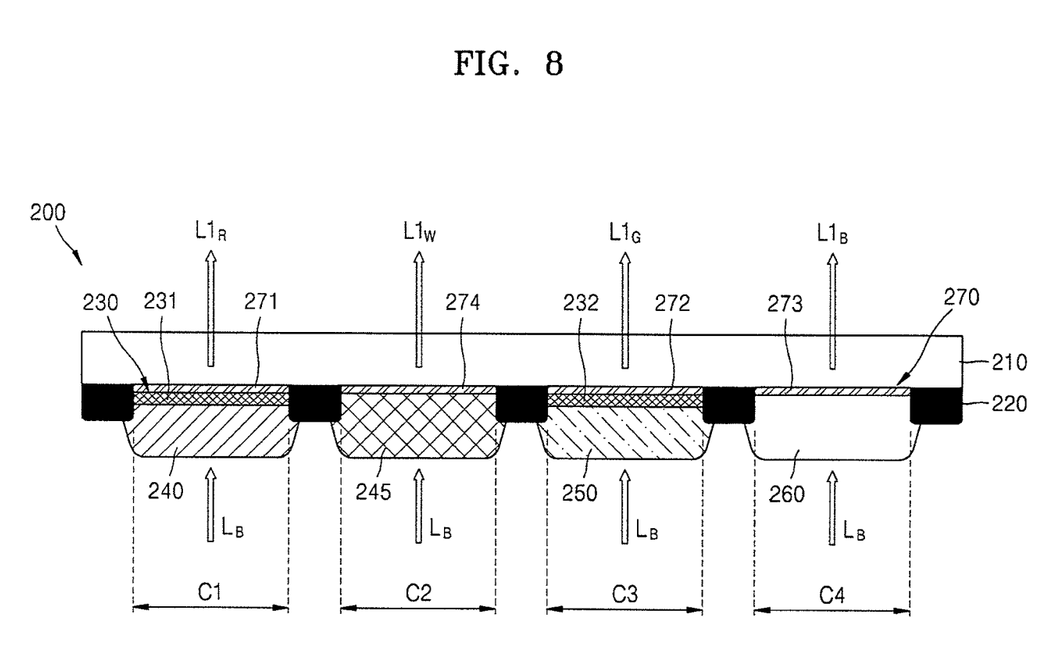
FIG. 8 illustrates a cross-sectional schematic view of a quantum dot color filter according to an example embodiment.

FIG. 8 is a cross-sectional view schematically illustrating a quantum dot color filter 200 according to an embodiment. Referring to FIG. 8, the quantum dot color filter 200 includes the first through fourth pixel areas C1, C2, C3, and C4, which output different colors from one another. The first through fourth pixel areas C1, C2, C3, and C4 may be separated from one another by partitions 220 disposed over a transparent substrate 210. For example, when a blue light $L_B$ is incident on the quantum dot color filter 200, a red light $L1_R$, a white light $L1_W$, a green light $L1_G$, and a blue light $L1_B$ may be respectively emitted from the first through fourth pixel areas C1, C2, C3, and C4.

A first color conversion layer 240 in the first pixel area C1 may include a plurality of quantum dots configured to convert an incident light into a first color light. The first color conversion layer 240 may convert the incident light into light having a wavelength longer than a wavelength of the incident light and then emit the converter light. The first color conversion layer 240 may include the plurality of quantum dots configured to absorb the blue light $L_B$ and emit the red light $L1_R$, for example.

A fourth color conversion layer 245 in the second pixel area C2 may include a plurality of quantum dots configured to convert an incident light into a fourth color light. The fourth color conversion layer 245 may convert a portion of the incident light into light having a wavelength longer than a wavelength of the incident light. The fourth color conversion layer 245 may convert a portion of the incident blue light $L_B$ into the red light $L1_R$ and may convert another portion of the incident blue light $L_B$ into the green light $L1_G$, while allowing some of the light to remain unconverted. Accordingly, in the fourth color conversion layer 245, the blue light $L1_B$, which is not converted, and the red light $L1_R$ and the green light $L1_G$, which are converted, are mixed and then the white light $L1_W$ may be emitted.

A second color conversion layer 250 in the third pixel area C3 may include a plurality of quantum dots configured to convert an incident light into a second color light. The second color conversion layer 250 may convert the incident light into light having a wavelength longer than a wavelength of the incident light and then emit the converted light. The second color conversion layer 250 may include the plurality of quantum dots configured to absorb the blue light $L_B$ and emit the green light $L1_G$, for example.

The plurality of quantum dots of the first, second, and fourth color conversion layers 240, 250, and 245 may include one of nanocrystalline materials, e.g., a silicon-based nanocrystal, a group II-VI-based compound semiconductor nanocrystal, a group III-V-based compound semiconductor nanocrystal, a group IV-VI-based compound semiconductor nanocrystal, and a mixture thereof.

The group II-VI-based compound semiconductor nanocrystal may include at least one selected from CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe. The group III-V-based compound semiconductor nanocrystal may include at least one selected from GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The group IV-VI-based compound semiconductor nanocrystal may include SbTe, for example.

Even if the quantum dots of the first, second, fourth color conversion layers 240, 250, and 245 include the same material, emitting lights include different wavelengths from each other according to sizes of the quantum dots. The smaller a size of a quantum dot, the shorter a wavelength of the emitting light. Accordingly, lights of different visible spectrums may be emitted by adjusting sizes of the quantum dots of the first, second, and fourth color conversion layers 240, 250, and 245.

When red light is generated from the first color conversion layer 240 and green light is generated from the second color conversion layer 250, the materials of the quantum dots of the first and second color conversion layers 240 and 250 may be same, but the size of the quantum dots of the first color conversion layer 240 may be greater than the size of the quantum dots of the second color conversion layer 250.

A dispersion material layer 260 may be in the fourth pixel area C4 to disperse the incident light. The dispersion material layer 260 does not convert the incident blue light $L_B$ to generate non-converted blue light $L1_B$. The dispersion material layer 260 may include titanium oxide $TiO_2$. However, the material of the dispersion material layer 260 is not limited thereto. The dispersion material layer 260 may include at least one of various materials as long as the material does not convert but merely disperses the incident light.

A blue light blocking layer 230 may be disposed over the first and second color conversion layers 240 and 250 and may block emission of the blue light $L_B$ which has not been converted in the first and second color conversion layers 240 and 250. The blue light blocking layer 230 may include a first blue light blocking portion 231 disposed over the first color conversion layer 240 and a second blue light blocking portion 232 disposed over the second color conversion layer 250.

A reflection preventing layer 270 may be disposed over the blue light blocking layer 230. The reflection preventing layer 270 may include a first reflection preventing layer 271 disposed over the first blue light blocking portion 231, and a second reflection preventing layer 271 disposed over the second blur light blocking portion 231. The reflection preventing layer 270 may further include a third reflection preventing portion 273 disposed over the dispersion material layer 260, and a fourth reflection preventing portion 274 disposed over the fourth color conversion layer 245.

The reflection preventing layer 270 may include the plurality of layers 170a, 170b, 170c, 170d, 170e, and 170f respectively having different refractive indices. The refractive indices of the plurality of layers 170a, 170b, 170c, 170d, 170e, and 170f become greater from the outside to an inside thereof.

The refractive indices of the plurality of layers 170a, 170b, 170c, 170d, 170e, and 170f of the reflection preventing layer 270 gradually increase from the outside to the inside. The plurality of layers 170a, 170b, 170c, 170d, 170e, and 170f may include at least one of silicon oxide, silicon nitride, or silicon nitride oxide.

Figure 9:
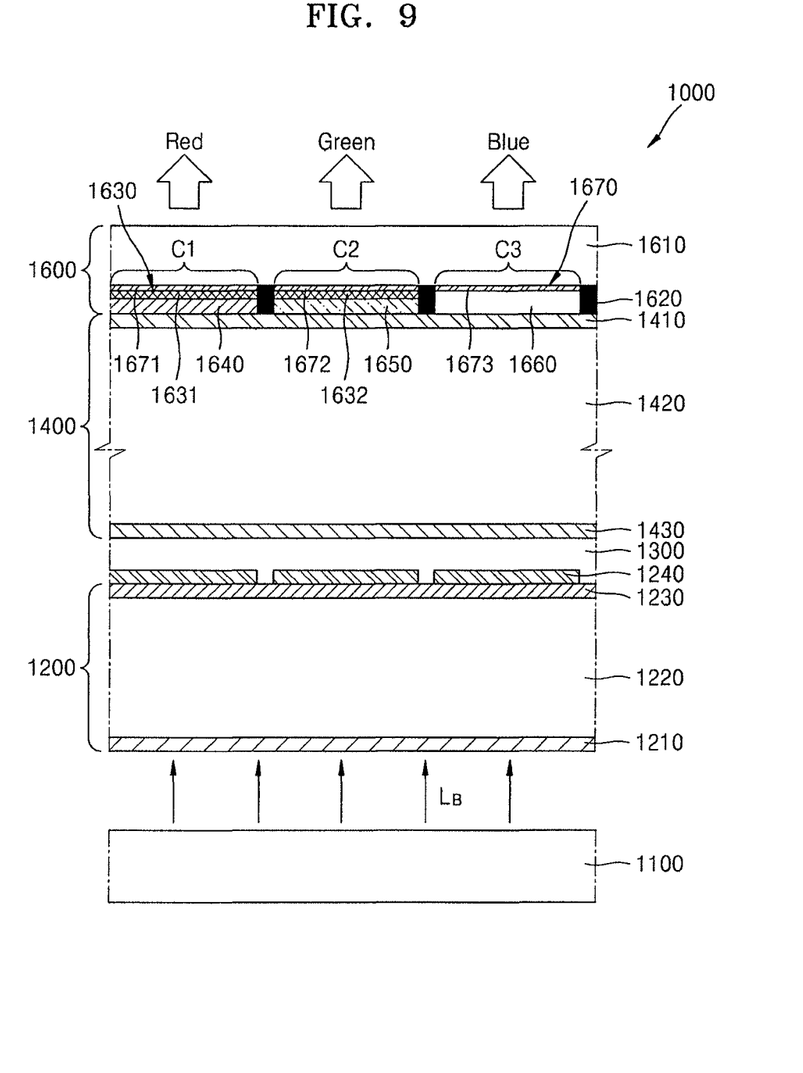
FIG. 9 illustrates a cross-sectional schematic view of a display apparatus according to an example embodiment.

FIG. 9 is a cross-sectional view schematically illustrating a display apparatus 1000 according to an embodiment.

The display apparatus 1000 includes a backlight apparatus 1100, a liquid crystal panel disposed over the backlight apparatus 1100, and a quantum dot color filter 1600 disposed over the liquid crystal panel. The backlight apparatus 1100 provides the liquid crystal panel with light usable to form an image. The liquid crystal panel may include a lower substrate 1200 and an upper substrate 1400, which face each other, and a liquid crystal layer 1300 between the lower substrate 1200 and the upper substrate 1400. The quantum dot color filter 1600 may change a wavelength of light emitted from the backlight apparatus 1100 and passed through the liquid crystal panel, to form a color.

The backlight apparatus 1100 may include a light source to generate blue light $L_B$ and provide the generated blue light to the liquid crystal panel.

The lower substrate 1200 may include a first substrate 1220, a lower polarization plate 1210 below the first substrate 1220, and a pixel electrode 1240 above the first substrate 1220. A thin film transistor (TFT) array layer 1230 may be between the first substrate 1220 and the pixel electrode 1240, and includes a plurality of transistors (not illustrated) to controls areas of the liquid crystal layer 1300 which respectively correspond to pixels.

The first substrate 1220 may include a glass material or a transparent plastic material. The lower polarization plate 1210 transmits only light having a particular polarization. For example, the lower polarization plate 1210 may transmit light linearly polarized in a first direction.

The TFT array layer 1230 may include the plurality of transistors and a gate wiring and a data wiring which are configured to respectively apply a gate signal and a data signal to each of the plurality of transistors. The pixel electrode 1240 is connected to a drain electrode of the transistor of the TFT array layer 1230 and receives a data voltage from the drain electrode.

The upper substrate 1400 may include a second substrate 1420, an upper polarization plate 1410 disposed above the second substrate 1420, and a common electrode 1430 disposed below the second substrate 1420.

The upper polarization plate 1410 transmits only light having a particular polarization. For example, the upper polarization plate 1410 may transmit light linearly polarized in a second direction perpendicular to the first direction. However, the present disclosure is not limited thereto. The upper polarization plate 1410 and the lower polarization plate 1210 may be a same polarization plate configured to transmit light of a same polarization.

The liquid crystal layer 1300 between the upper substrate 1400 and the lower substrate 1200 may control arrangement of liquid crystal molecules included in the liquid crystal layer 1300 according to a voltage applied between the common electrode 1430 and the pixel electrode 1240. That is, according to the voltage applied between the common electrode 1430 and the pixel electrode 1240, an area of the liquid crystal layer 1300 between the common electrode 1430 and the pixel electrode 1240 is controlled between an on-mode, in which polarization of an incident light is changed, and an off-mode, in which polarization of the incident light is not changed. Also, a degree of the changed polarization of the incident light may be adjusted to output intermediate gradations.

The quantum dot color filter 1600 include a transparent substrate 1610, first through third pixel areas C1, C2, and C3, and partitions 1620 to separate the first through third pixel areas C1, C2, and C3 from each other.

The first through third pixel areas C1, C2, and C3 respectively display red, green, and blue as described above. The first pixel area C1 includes a first color conversion layer 1640 configured to convert a blue light $L_B$ into a red light, the second pixel area C2 includes a second color conversion layer 1650 configured to convert the blue light $L_B$ into a green light, and the third pixel area C2 includes a dispersion material layer 1660.

The first and second color conversion layers 1640 and 1650 may include a blue light blocking layer 1630 configured to block emission of the blue light $L_B$, which is not converted by the first and second color conversion layers 1640 and 1650. The blue light blocking layer 1630 may include a first blue light blocking portion 1631 disposed over the first color conversion layer 1630 and a second blue light blocking portion 1632 disposed over the second color conversion layer 1650.

The first blue light blocking portion 1631 transmits the red light, which is converted by the first color conversion layer 1640, and blocks the blue light $L_B$, which is not converted by the first color conversion layer 1640. The second blue light blocking portion 1632 transmits the green light, which is converted by the second color conversion layer 1650, and blocks the blue light $L_B$, which is not converted by the second color conversion layer 1650.

The color filter 1600 may include a reflection preventing layer over a blue light blocking layer and may prevent reflection of an external light incident from outside. The reflection preventing layer may be disposed over a dispersion material layer.

A reflection preventing layer 1670 may be disposed over the blue light blocking layer 1630. The reflection preventing layer 1670 may include a first reflection preventing layer 1671 disposed over the blue light blocking portion 1631 and a second reflection preventing portion 1672 disposed over the second blue light blocking portion 1632. The reflection preventing layer 1670 may further include a third reflection preventing portion 1673 disposed over the dispersion material layer 1660.

The blue light $L_B$ is emitted from the backlight apparatus 1100, passes through the liquid crystal panel, is on or off in the respective pixel areas according to image information, enters into the quantum dot color filter 1600, and is converted into a red light, a green light, and a blue light so that an image is displayed. Here, since the reflection preventing layer 1670 prevents reflection of the external light, a color reproduction characteristic is improved.

Meanwhile, in the above-described embodiment, a case, in which the backlight apparatus 1100 emits the blue light $L_B$, is explained. However, the present disclosure is not limited thereto. The backlight apparatus 1100 may include one of various backlight apparatuses as long as a quantum dot characteristic of a quantum dot color filter is changed to convert an incident light into a different color to be irradiated. For example, the backlight apparatus may irradiate an ultraviolet light.

As described above, in the quantum dot color filter, the blue light blocking layer blocks emission of the blue light, which is not converted by the color conversion layer, and the reflection preventing layer prevents reflection of an external light by the blue light blocking layer. The display apparatus including the quantum dot color filter which is described above, may improve color reproduction.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display apparatus, comprising:
    a panel; and
    a quantum dot color filter on the panel,
    wherein the quantum dot color filter includes:
        a first color conversion layer in a first pixel area and including a plurality of quantum dots to convert incident light into a first color light;
        a second color conversion layer in a second pixel area and including a plurality of quantum dots to convert incident light into a second color light;
        a blue light blocking layer including a first blue light blocking portion over the first color conversion layer to block emission of a blue light of the incident light which is not converted by the first color conversion layer, and a second blue light blocking portion over the second color conversion layer to block emission of the blue light of the incident light which is not converted by the second color conversion layer; and
        a reflection preventing layer including a first reflection preventing portion over the first blue light blocking portion to prevent reflection of external light incident thereon and to transmit the first color light from the first color conversion layer therethrough, and a second reflection preventing portion on the second blue light blocking portion to prevent reflection of external light incident thereon and to transmit the second color light from the second color conversion layer therethrough, and
    wherein the first reflection preventing portion and the second reflection preventing portion are spaced apart from one another.

2. The display apparatus as claimed in claim 1, wherein the reflection preventing layer prevents reflection of blue light of external light incident thereon.

3. The display apparatus as claimed in claim 1, wherein: the reflection preventing layer includes a plurality of stacked layers that have different refractive indices from one another; and the refractive indices of the plurality of stacked layers increase towards the blue light blocking layer.

4. The display apparatus as claimed in claim 1, wherein the blue light blocking layer includes a plurality of alternately stacked first and second layers that have different refractive indices from one another.

5. The display apparatus as claimed in claim 1, wherein a transmittance of the blue light blocking layer with respect to the blue light is equal to or less than 1%.

6. The display apparatus as claimed in claim 1, wherein the quantum dot color filter further includes a dispersion material layer provided in a third pixel area.

7. The display apparatus as claimed in claim 6, wherein the reflection preventing layer further includes a third reflection preventing portion over the dispersion material layer to prevent reflection of external light incident from the outside thereof.

8. The display apparatus as claimed in claim 1, further comprising: a transparent substrate on the quantum dot color filter, wherein the first reflection preventing portion of the reflection preventing layer is between the transparent substrate and the first blue light blocking portion, and the second reflection preventing portion of the reflection preventing layer is between the transparent substrate and the second blue light blocking portion.

9. The display apparatus as claimed in claim 1, further comprising:
    a transparent substrate on the quantum dot color filter,
    wherein the transparent substrate is between the first reflection preventing portion and the first blue light blocking portion, and the transparent substrate is between the second reflection preventing portion and the second blue light blocking portion.

\* \* \* \* \*